United States Patent
Matthews

(10) Patent No.: US 6,560,537 B1
(45) Date of Patent: May 6, 2003

(54) PROSPECTING TECHNIQUE

(75) Inventor: Larry Matthews, Calgary (CA)

(73) Assignee: Noranda Inc., Toronto (CA)

( * ) Notice: Subject to any disclaimer, the term of this patent is extended or adjusted under 35 U.S.C. 154(b) by 0 days.

(21) Appl. No.: 09/557,006

(22) Filed: Apr. 20, 2000

Related U.S. Application Data

(63) Continuation-in-part of application No. 09/295,378, filed on Apr. 21, 1999, now Pat. No. 6,330,513.

(51) Int. Cl.$^7$ .............................................. G06F 19/00
(52) U.S. Cl. ........................................... 702/2; 702/14
(58) Field of Search ................... 367/69, 73; 324/305; 702/16, 6, 2, 10, 14; 703/10

(56) References Cited

U.S. PATENT DOCUMENTS

| | | | |
|---|---|---|---|
| 1,240,328 A | * 9/1917 | Fressenden | 702/2 |
| 4,393,488 A | 7/1983 | Gassaway et al. | 367/75 |
| 4,617,518 A | * 10/1986 | Srnka | 324/365 |
| 4,878,205 A | 10/1989 | Gelchinsky | 367/71 |
| 5,170,377 A | 12/1992 | Manzur et al. | 367/73 |
| 6,002,642 A | * 12/1999 | Krebs | 367/73 |
| 6,131,071 A | * 10/2000 | Partyka et al. | 702/6 |

OTHER PUBLICATIONS

Keynote Session, Paper 7, "3–D Seismic Exploration".
Seismic Methods in Mineral Exploration, Paper 49, "Physical Properties and Seismic Imaging of Massive Sulphides".
Seismic Methods in Mineral Exploration, Paper 50, "Reflection Seismics for Gold, Platinum and Base Metal Exploration and Mining in Southern Africa".
Seismic Methods in Mineral Exploration, Paper 52, "Structurally Controlled Mineralization in Australia–How Seismic Profiling Helps Find Minerals: Recent Case Histories".
Seismic Methods in Mineral Exploration, Paper 53, "Sedimentary–Hosted Mineral Deposits: High–Resolution Seismic Survey in the Athabasca Basin".
Seismic Methods in Mineral Exploration, Paper 55, "Development of 3–D Seismic Exploration Technology for Ni–Cu Deposits, Sudbury Basin".
Seismic Methods in Mineral Exploration, Paper 56, "Seismic Exploration of the Manitouwadge Greenstone Belt, Ontario".
Seismic Methods in Mineral Exploration, Paper 59, "Seismic Reflection imaging of a Shallow, Fault–Controlled VMS Deposit in the Matagami Mining Camp, Quebec".
Seismic Methods in Mineral Exploration, Paper 61, "Full Waveform Acoustic Logging Applications in Mineral Exploration and Mining".

* cited by examiner

*Primary Examiner*—Edward Lefkowitz
*Assistant Examiner*—Victor J. Taylor

(57) ABSTRACT

Disclosed herein is a technique of prospecting for deep massive sulphide ore bodies, comprising the steps of selecting a geologic region which is substantially acoustically transparent; directing seismic waves at the region and collecting reflected or diffracted waves therefrom; and analyzing the collected waves for the presence of the massive sulphide ore bodies.

20 Claims, 3 Drawing Sheets

PROSPECTING TECHNIQUE

This application is a continuation-in-part of Ser. No. 09/295,378 filed Apr. 21, 1999 now U.S. Pat. No. 6,330,513.

BACKGROUND OF THE INVENTION

1. Field of the Invention

The present invention relates to mineral exploration, and more particularly to methods of detecting deep massive sulphide deposits by the use of seismic reflection surveys.

2. Description of the Related Art

Multidimensional seismic reflection survey techniques, for example two dimensional (2-D) and three dimensional (3-D) seismic reflection survey techniques, have allowed the petroleum industry to generate remarkably accurate structural and stratigraphic subsurface geologic models. This can be achieved because multiple reflection events are recorded from the highly reflective sedimentary stratigraphy. As a consequence of this non acoustic transparency, the industry has been able to discover oil and gas deposits several thousand meters below the earth's surface, making deep oil drilling an economically viable procedure.

The minerals industry has made a considerable investment in multi-dimensional seismic reflection techniques to adapt the procedure for detecting the presence of deep massive sulphide deposits. However, the use of multi-dimensional seismic technologies by the minerals industry has thus far been met with comparatively less success. In most cases, a massive sulphide is extremely difficult to discern within the complex acoustic wavefield generated by the other stratigraphic contracts of the geological region being explored.

To date, mineral exploration using seismic reflection surveys has been typically done on a broad spectrum of geological terrain known to be potential host sites for massive sulphide deposits Unfortunately, many of these regions exhibit poor signal to noise conditions. To date, this relatively poor data has been found to be an inherent feature of multi-dimensional seismic exploration for massive sulphides. Experts in die field have worked diligently to overcome these problems by using state-of-the-art acquisition and processing strategies derived from the petroleum industry, hoping to filter out the noise and to generate an accurate and reliable subsurface geologic model based on the remaining relatively poorly understood acoustic signature of the massive sulphide deposit. With this goal in mind, experts have developed a number of sophisticated procedures which have been published in a number of leading mining journal articles, many of which are listed herein below.

However, these investigations have thus far not yielded significant useful results.

It is an object of the present invention to provide a novel technique for prospecting for massive sulphides.

SUMMARY OF THE INVENTION

Briefly stated, the invention involves a technique of prospecting for deep massive sulphide ore bodies, comprising the steps of:

selecting a geologic region which is substantially acoustically transparent;

directing seismic waves at the region and collecting reflected and diffracted waves therefrom; and analyzing the collected waves for the presence of the massive sulphide ore bodies.

In one presently preferred aspect, the present invention provides an exploration process for evaluating a plurality of geological regions that are candidates for massive sulphide deposits. The process includes the steps of obtaining impedance characteristics for corresponding strata located in a selected one of said geological regions; analyzing the impedance characteristics for determining the presence of impedance transitions from one of the strata to another; validating the presence of a host lithology in said strata of the selected region based on said impedance transitions by determining whether said host lithology is substantially acoustically transparent, such that the host lithology is represented by a seismic profile which contains a substantial absence of impedance markers of magnitude greater than that of any survey noise present in said impedance characteristics; and confirming the selected region possesses a host stratigraphy that is substantially acoustically transparent and is therefore a candidate for a subsequent seismic investigation for massive sulphide deposits.

In another of its aspects, the invention provides a method of exploration for evaluating a plurality of geological regions for the suitability of direct detection of a massive sulphide deposit. This method includes the steps of obtaining impedance characteristics for corresponding strata located in a selected one of said geological regions; analyzing the impedance characteristics for determining the presence of impedance transitions from one of the strata of the selected region to another; validating the presence of a host lithology in said strata based on said impedance transitions by determining whether said host lithology is substantially acoustically transparent, such that said impedance transitions from said strata primarily contain only survey noise; and confirming the selected region possesses a host stratigraphy that is substantially acoustically transparent and is therefore a candidate for a subsequent seismic exploration for detection of the massive sulphide deposit.

Rather than simply applying the latest multi-dimensional seismic techniques on all geologic regions suspected of bearing massive sulphide deposits, the present technique involves selecting only those geologic regions which have a particular range of characteristics, primarily those suspected of having a local host stratigraphy which is essentially acoustically transparent, and then applying seismic survey techniques only on those selected geologic regions.

The term 'acoustically transparent' as a characteristic of a local host stratigraphy, refers to the ability for seismic waves to pass through the statigraphy while producing minimal or otherwise substantially non-interfering seismic reflections from geological boundaries which are not the boundaries of massive sulphide contacts. For example, an acoustically transparent local host stratigraphy may be one in which a massive sulphide deposit generates a recognizable peak (positive amplitude) on stacked seismic refection trace that exceeds the amplitude of noise from the survey, for example the noise originating from the local host rock itself, that is geologic noise, and the ambient noise originating from the seismic survey source and environment, The local host stratigraphy, in this case, is that which is in the vicinity of he massive sulphide itself, That is above and below the massive sulphide and not necessarily the entire depth investigation range of the geological terrain. In this case, a major 'marker' may be above or below the local host stratigraphy and could present a significant peak in an impedance trace but not otherwise substantially interfere with The acoustic transparency of the adjacent local host stratigraphy itself. This geologic marker could be used to help focus the search for anomalous seismic amplitudes to that zone of the stratigraphic column most likely to host deep massive sulphide deposits. For example, in some cases, a local host statigraphy may be essentially acoustically transparent if the seismic amplitude anomaly, resulting from a sulphide orebody, is approximately twice that of contacts within the local host stratigraphy.

BRIEF DESCRIPTION OF THE DRAWINGS

Several preferred embodiments of the present invention will now be described, by way of example only, with reference to the appended drawing in which:

FIG. 1a is a representation of a geological region;

FIG. 1b is a representation of an impedance log for the geological region of FIG. 1a;

FIG. 1c is a representation of a synthetic seismogram of the geological region of FIG. 1a;

DESCRIPTION OF THE PREFERRED EMBODIMENTS

The present technique is, at least in pan, based on the proposition that these selected geologic regions with an essentially acoustically transparent local host stratigraphy should be the source for a relatively easily detected seismic reflection, namely one generated by a massive sulphide deposit of sufficient size and thickness. This is due to the relatively strong impedance contrast that usuly exists between the massive sulphide deposit and their local host rocks. This means that established seismic techniques can be used to image the approximate size and particular location of the massive sulphide deposit, without first having to separate the deposit signal from the contaminating signals otherwise generated by the strata of the geologic regions not essentially acoustically transparent.

Desirably, a candidate geological region can be identified, in some cases, by the use of a relatively straightforward 1-D seismic analysis of a borehole, which can indicate, at least on a preliminary basis, the likelihood that the stratigraphy therein has the correct combination of velocity and density throughout its depth to have what may be a host lithology which presents a sufficiently acoustically transparent profile to make further seismic investigations worthwhile. A 1-D seismic analysis of this type can yield a useful plot (known in the field as a synthetic 'seismogram') based on The continuous velocity and density measurements along the borehole, as is illustrated. for example, in FIGS. 1a to 1e.

Figures 1A, 1B, 1C:
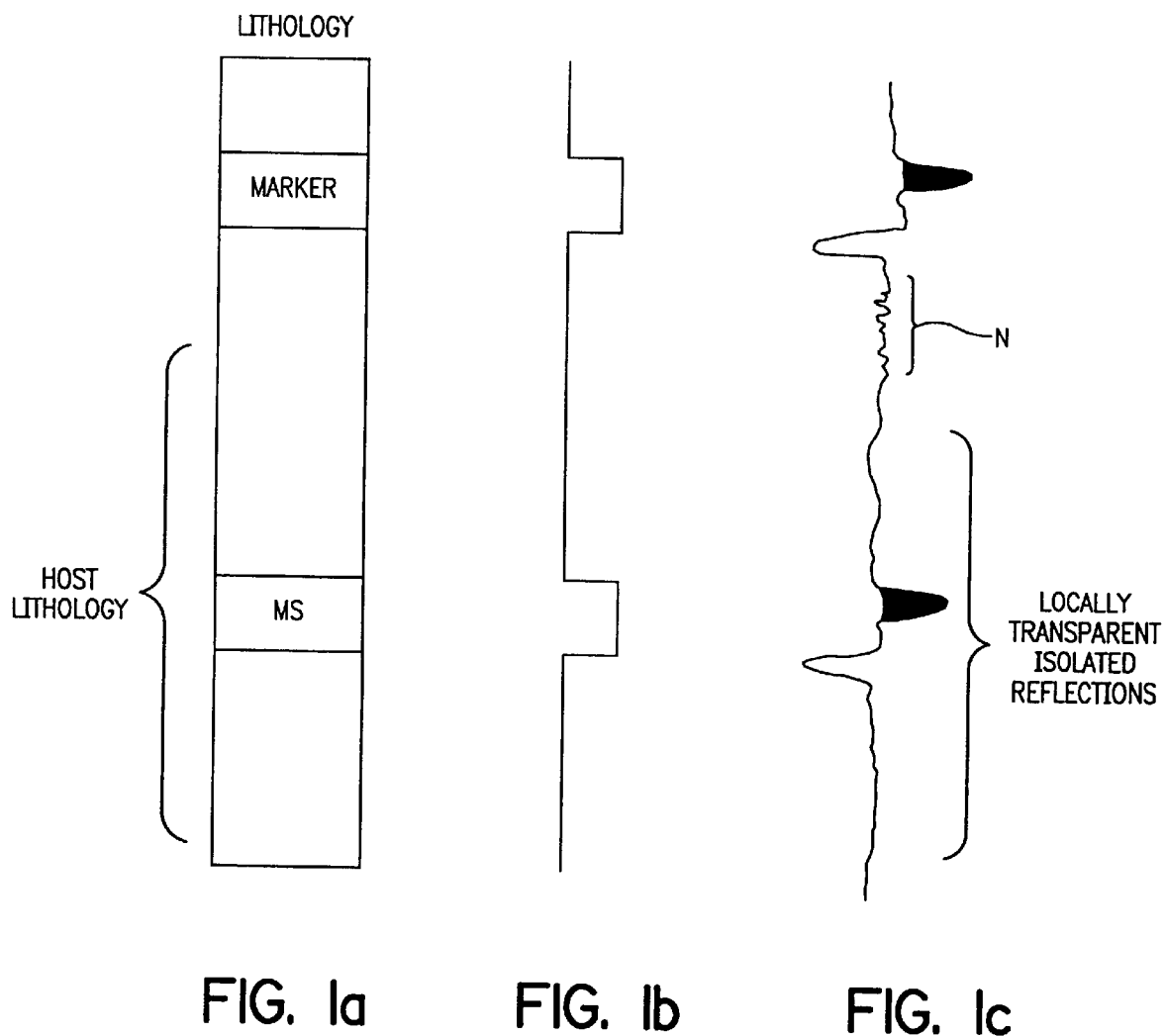
Figure 1D:
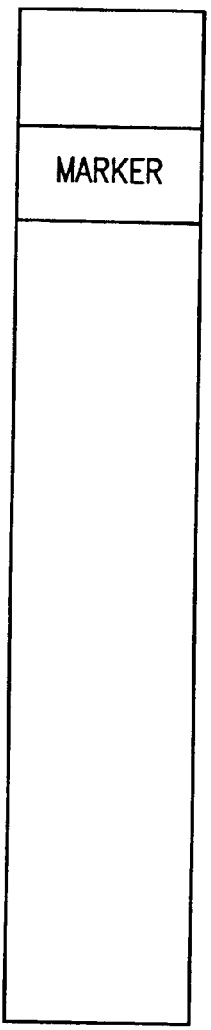
FIG. 1d is a representation of another geological region.
Figure 1E:
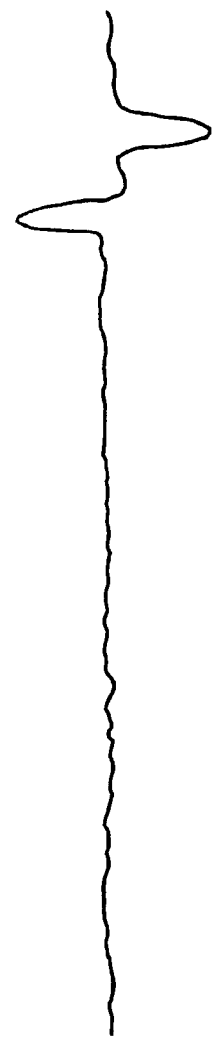
FIG. 1e is a representation of a synthetic seismogram for the geological region of FIG. 1d.

FIG. 1a shows the cross section of one example of a desirable geological region, with the vertical dimension corresponding to the depth thereof. A massive sulphide deposit is shown by the block MS within a local host lithology which is below a major stratigraphic marker. FIG. 1b shows a view of an acoustic impedance log (velocity× density) indicating the host lithology shows, in this particular example, essentially no impedance contrasts, it being understood that there may in fact be some residual impedance contrast depending on the nature of the geological region in question. FIG. 1c shows a synthetic seismogram trace indicating the seismic impulses at the leading and trailing edges of the impedance at the marker as well as at the massive sulphide deposit, while the local host lithology presents relatively little amplitude disturbance apart from the geological and seismic noise, illustrated, for example at the region identified at 'N'. FIG. 1d in turn illustrates a similar geological regional lithology to that shown in FIG. 1a, but in this case without the massive sulphide deposit of FIG. 1a. The synthetic seismogram for the geological region of FIG. 1d is shown in FIG. 1e which in this case has a similar curve to FIG. 1c, but without the two seismic impulses generated by the massive sulphide deposit.

Thus, the present process provides a method by which massive sulphide deposits can be detected by first selecting only those geologic regions whose stratigraphy are, for example, crystalline and which have a local host presenting an essentially acoustically parent seismic profile. Conveniently, the present process may employ the 2-D and 3-D seismic technologies which are common to the petroleum industry.

Thus, the present process provides an exploration process which involves evaluating or surveying a plurality of geological regions which are candidates for massive sulphide deposits, identifying a site which has a host lithology is essentially acoustically transparent and carrying out a seismic investigation on the site.

One example of the present procedure follows.

Rock Properties

The first step is to select a number of geological regions tat are suspected of having the desired essentially acoustically transparent local host statigraphy and of hosting deep massive sulphide deposits. Next representative rock samples, both core and surface rocks if desired, may be collected and analyzed, for example at a laboratory bench, for velocity and density If desired, the data may be analyzed in the form of graphs of density versus velocity for the purpose of identifying impedance markers, that is those impedance transitions in the strata that are likely to produce acoustic reflections, the greater the impedance changes from one strata to another, the greater the acoustic reflection as the wave passes through the transition. If there are a number of these impedance markers in the local host lithology, the lithology may not be sufficiently acoustically transparent On the other hand, the absence of these impedance markers in the local host lithology make the geologic region bearing the local host a possible candidate for further seismic analysis.

Borehole Logging

Once a candidate region has been identified, borehole data may be acquired, either by accessing already recorded data, if such exists for the candidate region, or by having dedicated boreholes sufficiently deep to pierce a significant portion of the stratigraphy of the terrain, in order to measure the continuous ranges in density and velocity This step can use a number of different borehole techniques including that referred to in the field as "slim hole" technology which uses bores less than 10 cm in diameter.

Numerical Modeling

A series of 1-D synthetic seismograms may be generated from the borehole data to evaluate reflectivity, resolution and signal-to-noise ratio, which are important to determine if the local host lithology is likely to be sufficiently acoustically transparent. The synthetic seismogram is a plot of the expected wavefield response from a local hosting stratigraphy defined by the acoustic impedance log. A substantially acoustically transparent lithology should present a seismogram which is relatively featureless except for ambient environmental and instrument noise, one example is shown in FIG. 1e. Additional 2D and 3D synthetic modeling may also be employed to investigate issues such as dip, shape and volume on the expected wavefield response of various hypothetical massive sulphide deposits.

Field Test

Given the high cost of 3-D surveys, a 2-D test survey line may, if desired, be acquired across the proposed 3-D survey area to generate initial seismic data in an attempt to verify whether the candidate region in fact does possess a local host lithology with an acoustic transparency indicated by the earlier tests. The 2-D analysis results are also used to evaluate the proper locations and other parameters of both the seismic sources and receivers, offsets, fold, frequency content, signal-to-noise and other data acquisition and processing issues, which are well known to the petroleum industry and described in more detail in the references below.

3-D Exploration

Given the need to properly locate targets in 3-D space and the relative size of the potential targets, 2-D surveys may not be adequate in many cases. It is from the 3-D survey and the subsequent analysis thereof that massive sulphide deposits, if they exist in a local host lithology of the candidate geological region may be detected and, if so, at what size, depth and so on. These studies, per se, are straightforward and well known to those skilled in the art.

Figure 2:
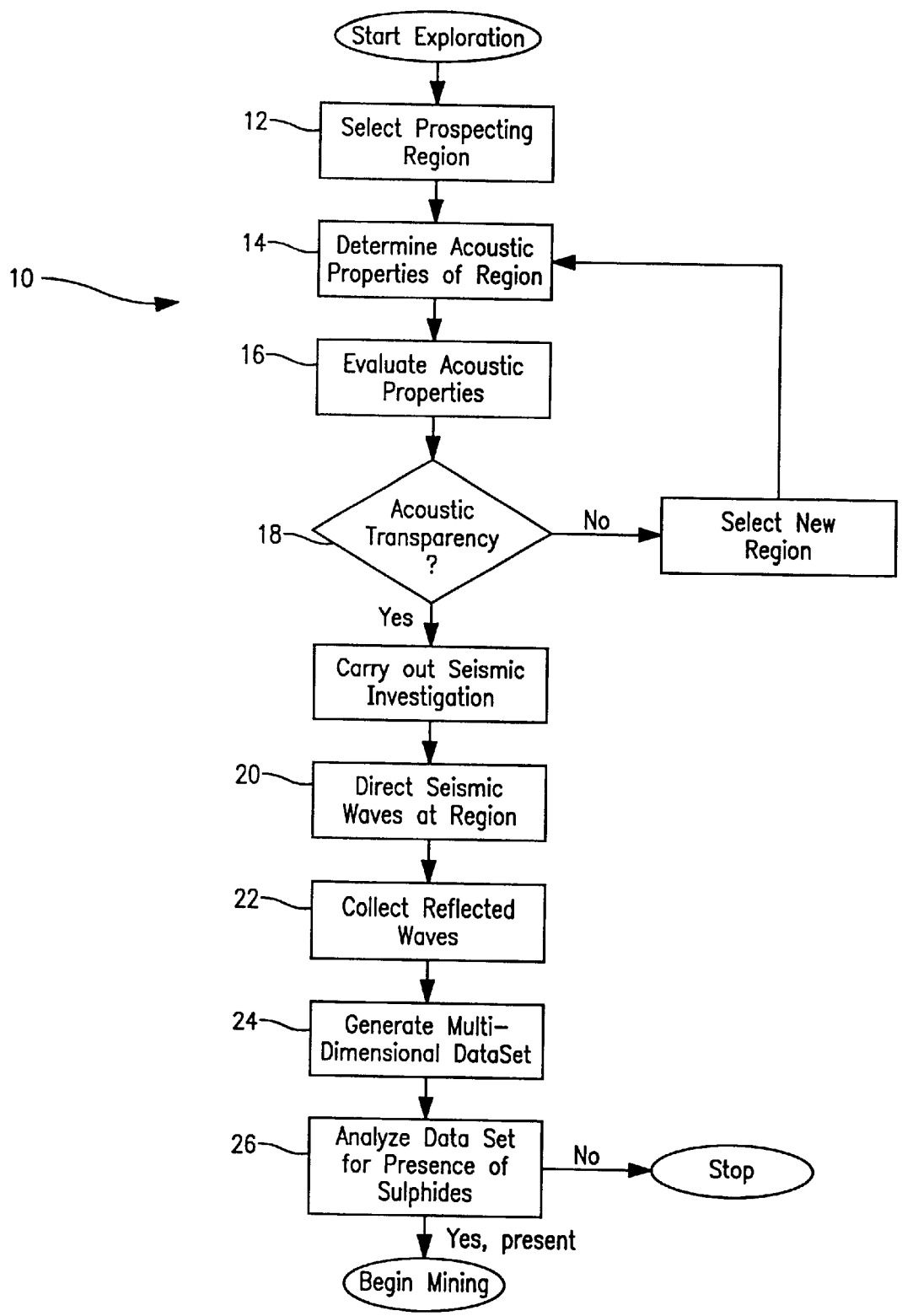
FIG. 2 is a flow chart of a seismic exploration.

A technique of prospecting 10 for massive sulphide ore bodies starts by selecting a prospecting region 12 and then determining acoustic properties of the region at step 14 is shown in FIG. 2. The acoustic properties are evaluated at step 16 to determine whether a substantially acoustically transparent host lithology is present at step 18. If the transparent host lithology is present, then the seismic investigation is carried out by directing seismic waves at the transparent lithology at step 20 and collecting the reflected waves from the lithology at step 22. The reflected waves are then analyzed by creating a multidimensional data set that can contain two dimensional or three dimensional data at step 24. The presence of sulphides is determined through analysis of the data set at step 26, thereby either signaling the start of a mining evaluation program or stopping investigation in the selected region.

Adam, E., Arnold, G., Beaudry, C., Matthews, L., Milkereit, B., Perron, G., and Pineault, R., Exploration 97, 3-D Seisuc exploration for VMS deposits, Maragami, Québec.

Adam, E., Milkereit, B., Arnold, G., and Pineault, R., 1996, Seismic response of the Bell Allard orebody, Matagami, Québec: 66th Ann. Internat. Mtg., Soc. Expl. Geophys., Expanded Abstracts, 634–637.

Ashton, C. P., Bacon, B., Deplanté, C., Ireson, D., and Redekop, G., 1994: 3-D Seismic Survey Design p. 19–32 in Schlumberger Oilfield Review, Volume 6. Number 2 April 1994, edited by Henry N. Edmundson.

Berryhill, J. R., 1977, Diffraction response for non-zero separation of source and receiver: Geophysics, 38, 1176–1180.

Beydotn, W. B., and Mendes, M., 1989, Elastic ray-Born 12 migration/inversion, Geophy. J Internat., 97, 151–160.

Birch, F., 1960, The velocity of compressional waves in rocks to 10 kilobars, 1, Journal of Geophys. Res., 65, 1083–1102.

Boemer, D. E., Milkereit, B., and Naldrett, A. J., 1994, Introduction to The Special Section on the Lithoprobe Sudbury Project: Geophysical Research Letters, 21, 1–4.

Bradshaw, M., 1993. Austalian Petroleum Systems PESA Journal, Vol. 21, 43–53.

Drumnond, B. J., and Goleby, B. R., 1993. Seismic reflection images of major ore-controlling structures in The Eastern Goldfields, Western Australia. Exploration Geophysics, 24, 473–478.

Brown, A. R., 1991. Interpretation of three-dimensional seisic data, third edition. AAPG Memoir 42, AAPG, Tulsa, 341 pp.

Campbell, G., 1990, The seismic revolution in gold and platinum prospectmg: South African Geophysical Association Yearbook, South African Geophysical Association, 37–45.

Campbell, G., 1994, Geophysical contributors to mine-development planning: a risk reduction approach, in Anhaeusser, C. R., ed., Proc. XVth CMMI Congress: SAIMM Symposium Series S14, 3, 283–325.

Campbell, G., and CrotUy, J. H., 1990, 3-D Seismic mapping for mine planning purposes at the South Deep Prospect, in Ross-Watt, D. A. J. and Robinson, P. D. K., eds Proc. International Deep Mining Conf: SAIMM Symposium Series S10, 2, 569–597.

Campbell, G., and Peace, D. G., 1984, Seismic reflection experiments for gold exploration, Wits basin, Republic of South Africa: Presented at the 46th Ann. Int. Mtg, Eur. Assn. Expl. Geophys.

Chnstensen, N. I. 1985, Measurement of dynamic properties of rock at elevated temperatures and pressures: Amer. Soc. for Testing and Materials, Philadelphia, Special Tech. Pub. 869, 93–107.

Cinq-Mars, A., Mwenifumbo, C. J., and Killeen, P. G., 1995, Borehole geophysical logs from Lithoprobe project boreholes at Les Mines Selbaies and Lac Matagami, Québec. GSC Open File 2813.

Dahle, A., Gjoystdal, H., Grammeltdveldt, G., and Hansen, T., 1985, Application of seismic reflection methods for ore prospecting in crystalline rock: First Break, 3, 8.

de Wet, J. A. J., and Hall, D. A., 1994: Interpretation of the Oryx 3-D Seismic Survey; p. 259–270 in 15th CMI Congress, 4–9 September 1994, Geology Vol. 3, Edited by C. R. Anhaeusser.

Dumnmond, B. J., Korsch, R. J., Barton, T. J., and Yeates, A. N., 1996. Crustal Architecture in northwest Tasmania revealed by deep seismic reflection profiling. Austlian Geological Survey Orgsation, Research Newsletter, 25, 17–19.

Drummond, B. J., MacCready, T., Lister, G. S., Goncharov, A., Goleby, B. R., Page, R., and Wyborn L. A. I., 1995. AGCRC Mount Isa Transect. AGCRC Mount Isa Trasect Workshop, 50pp (unpublished).

Durrheim, R. J., 1986, Recent reflection seismic developments in the Witwatersrand Basin, in Barazagi, M. and Brown, L., eds, Reflection Seismology: a global perspective: Am. Geophys. Union, Geodynamics Series, 13, 77–83.

Durrheim, R. J., and Maccelan, M. J., 1991, Seismic exploration for precious metals in the hard rock environment, 61st Ann. Int. Mtg., Soc. Expl. Geophys., Expanded Abstracts, 159–162.

Durrheim, R. J., Nicolaysen, L. O., and Corner, B., 1991, A deep seismic reflection profile across the Archean-Proterozoic Witwatersrand Basin, South Africa, in Meissner, R., Brown, L., Dürbaum, H-. J., Franke, W., Fuchs, K., and Seifert, F., eds., Continental Lithosphere: Deep Seismic Reflections: Am. Geo-phys. Union, Geodynamics Series, 22, 213–224.

Eaton, D., 1996, BMOD3D: A program for three dimensional seismic modeling using the Born approximation. GSC Open File 3357.

Eaton, D., and Milkereit, B., Exploration 97, Seismic exploration for minetals. Enachescu, M., 1993, Amplitude interpretation of 3-D reflection data: The Leading Edge, 12, 678–683

Eaton, D., Guest, S., Milkereit, B., Bleeker, W., Crick, D., Schmitt, D., and Salisbury, M., 1996, Seismic imaging of massive sulfide deposits: Part III. Bore-hole seismic imaging of near-vertical structures; Econ. Geol., 91, 835–840.

Eaton, D. W., 1996, BMOD3D-a program for three-dimensional seismic modeling using the Born approximation: Geological Survey of Canada, Open File 3357.

Fallon, G. N., and Busuttil, S., 1992. An appraisal of the geophysical effects of the Mount Isa ore bodies. Exploration Geophysics, 23, 133–140.

French, W. S., 1974, Two dimensional and three dimensional migration of model-experiment reflection profiles. Geophysics, 39, 265–277.

Goleby, B. R., Drumnmond, B. J., and MacCready, T., 1996. The Mount Isa geodynamic transect: The deep seismic reflection profile south of Mount Isa and Cloncurry. Aust. Geol. Survey Organsation, Research Newsletter, 24, 6–8.

Goleby, B. R., Rattenbury, M. S., Swager, C. P., Drummond, B. J., Williams, P. R., Sheraton, J. W., and Heinrich, C. A., 1993 Archaean crustal structure from seismic reflection profiling, Eastern Goldfields, Western Australia. Australian Geological Survey Organisation, Record, 1993/15.

Greenlee, S. M., Gaskins, G. M., and Johnson, M. G., 1994, 3-D seismic benefits from exploration though development: An Exxon perspective: The Leading Edge, 13, no. 7, 730–734.

Hajnal, Z., and Reilkoff, B. R., 1980, Reflection data processing in the Athabasca basin, 50th Ann. Internat. Mtg., Soc. Expl. Geophys., Expanded Abstracts, 1387–1415.

Hardage, R. A., 1985, Vertical seismic profiling, part A: Principles: Geophysical Press.

Hobson, G. D., and MacAuley, H. A., 1969, A seismic reconnaissance survey of the Athabasca formation, Alberta and Saskatchewan, Geol. Survey of Canada, Paper 69–18, 35–47.

Hurich, C. A., 1996, Statistical description of seismic reflection wavefields: A step towards quantitative interpretation of deep seismic reflection profiles: Geo-phys. J. Int., 125, 719–728.

Isaac, J. H., and Stewart, R. R., 1993, 3-D seismic expression of a cryptoexplosion structure: Can. J. Expl., Geophys., 29, 429–439.

Jones, T., and Nur, A., 1984. The nature of seismic reflections from deep crustal fault zones. Journal of Geophysical Research. 89, 3153–3171.

Juhlin. C., 1990, Interpretation of the reflections in the Siijan Ring area based on results from the Gravberg-I borehole: Tectonophysics, 173, 345–360.

Killeen, P. G., Elliott, B. E. and Mwenifiumbo, C. J., 1993, Ore deposit signatures and borehole geophysics test sites in Ontario: Proceedings of the 5th International Symposium on Geophysics for Minerals, Geotechnical and Environ-mental Applications, paper G.

Killeen, P. G., Mwemfumbo, C. J. and Elliott, B. E., 1995, Mineral deposit signatures by borehole geophysics Data from the borehole geophysics test site at the McConnell nickel deposit (Garson Offset), Ontario, Geol. Survey of Canada, Open File 2811.

King, M. S., Stauffer, M. R., Yang, H. J. P., and Hajnal, Z., 1988, Elastic-waves and related properties of clastic rocks from the Athabasca basin, western Canada, Can. J. Explor. Geophysics, 24, 110–116.

Kohler, K., and Koenig, M., 1986, Reconstruction of reflecting structures from vertical seismic profiles with a moving source: Geophysics, 51, 1923–1938.

Lucas, S. B., Green, A., Hajnla, Z., White, D., Lewry, J., Ashton, K., Weber, W., and Clowes, R., 1993, Deep seismic profile across a Proterozoic collision zone: surprises at depth, Nature, 363, 339–342.

Ludwig, J., Nafe, J., and Drake, C., 1971, Seismic refraction, in Maxwell, A. E., ed., The Sea, v. 4: Wiley, 53–84.

Mackenzie, B. W., 1989, Mineral exploration economics; Focusing to encourage success, in G. D. Garland, ed., Proceedings of Exploration '87,: Third Decennial International Conference on Geophysical and Geochemical Exploration for Minerals and Groundwater: Ontario Geological Survey, Spec. Vol. 3, 3–21.

McCreary, R. G. and Wänstedt, S., 1995, Applications of multivariate statistics and pattern recognition to geophysical logging at Noranda: Proceedings of the 6th International Symposium on Borehole Geophysics for Minerals, Geo-technical and Groundwater Applications, paper G.

Milkereit B., Berrer, E. K., Watts, A., and Roberts, B., Exploration 97, Development of 3-D seismic exploration technology for Ni-Cu deposits, Sudbury Basin.

Milkereit, B., Adam, E., Barnes, A., Beaudry, C., Pineault, R., and CinqMars, A., 1991, An application of reflection seismology to mineral exploration in The Matagami area, Abitibi belt, Québec, in Current Research, Part C: Geological Survey of Canada, Paper 92-1C, 13–18.

Milkereit, B., and Eaton, D. W., 1996, Towards 3-D seismic exploration technology for the crystalline crust, in S. E. Lawton, ed., Trends, Technologies, and Case Histories for the Modern Explorationist: Prospectors and Developers Association of Canada, Short Course notes, 17–36.

Milkereit, B., Berrer, E. K., Watts, A., and Roberts, B., Exploration 97, Development of 3-D seismic exploration technology for nickel-copper deposits, Sudbury Basin.

Milkereit, B., Eaton, D., Wu, J., Perron, G., and Salisbury, M., 1996, Seismic Imaging of Massive Sulfide Deposits: Part II. Reflection Seismic Profiling, Economic Geology, 91, 829–834.

Milkereit, B., Eaton, D., Wu, J., Perron, G., Salisbury, M., Berrer, E., Morrison, G., 1996, Seismic imaging of massive sulphide deposits, part II: Reflection seismic profiling: Economic Geology, 91, 839–844.

Milkereit, B., Reed, L., and Cinq-Mars, A., 1992, High frequency reflection pro-filing at Les Mines Selbaie, Québec: Canada Geological Survey Curr. Res., 92-1E, 217–224.

Mwenifumbo, C. J., Killeen, P. G., Elliott, B. E. and Pflug, K. A., 1993, The borehole geophysical signature of the McConnell nickel deposit, Sudbury area: Proceedings of the 5th International Symposium on Geophysics for Minerals, Geotechnical and Environmental Applications, paper I.

Nestvold, E. O., 1992, 3-D seismic: Is the promise fulfilled? The Leading Edge, 11, no. 6, 12–19.

Nestvold, E. O., 1996, The impact of 3-D seismic data on exploration, field development, and production, in P. Weimer and T. L. Davis, eds., Three-Dimensional Seismic Methods: AAPG Studies in Geology No. 42 and SEG Geophysical Developments Series No. 5, 1–8.

Odgers, A. T. R., Hinds, R. C., and Von Gruenewaldt, G., 1993. Interpretation of a seismic reflection survey across the southern Bushveld Complex, South African J. Geol., 96, 205–212.

Overton, A., 1977, Seismic determination of basement depts, Athabasca basin, Geol. Surv. Can., Rept. of Activities Part C, Geol. Surv. Can., Paper 77-1C, 19–25.

Paillet, F. L. and Cheng, C. H., 1991, Acoustic Waves in Boreholes: CRC Press Inc.

Pflug, K. A., and Killeen, P. G., 1997, Borehole geophysical logs at the Corner Bay copper deposit, Chibougamau area, Québec: Geol. Survey of Canada, Open File 3388.

Pflug, K. A., Killeen, P. G., and Mwenifumbo, C. J. 1994, Acoustic velocity logging at the McConnell nickel deposit, Sudbury area, Ontario: preliminary in situ measurements: Current Research 1994-C, Geol. Survey of Canada, 279–286.

Pretorius, C. C., Jamison, A. A., and Irons, C., 1987: Seismic Exploration in the Witwatersrand Basin, Republic of South Africa; p. 241–253 in Proceedings of Exploration 87, Ontario Geological Survey, Special Volume 3 (1989).

Pretorius, C. C., Jamison, A. A., and Irons, C., 1989, Seismic exploration in the Witwatersrand Basin, Republic of South Africa, in Garland, G. D., ed., Proc. Exploration 87, 3rd Decennial Int. Conf. on Geophysical and Geochemical Exploration for Minerals and Groundwater:

Special Publication, Ontario Geol. Surv., 3, 241–253.

Pretorius, C. C., Steenkamp, W. H., and Smith, R. G., 1994, Developments in data acquisition, processing, and interpretation over ten years of deep vibroseis-mic surveying in South Africa, in Anhaeusser, C. R, ed., Proc. XVth CMMI Congress; SAIMM Symposium Series S14, 3, 249–258.

Pretorius, C. C., Trewick, W. F., and Irons, C., Explorion 97, Application of 3-D seismics to mine planning at Vaal Reefs gold mine, number 10 shaft, Republic of South Africa.

Reed, L. E., 1993, Seismic reflection surveying for mining exploration applications: A review of practice past and current with an outlook for the future: Mineral Industry Technology Council of Canada, unpublished report, 219 pp.

Roberts, B., Zaleski, E., Adam, E., Perron, G., Petrie, L., Darch, W., Salisbury, M., Eaton, D., and Milkereit, B., Exploration 97, Seismic exploration of the Manitouwadge Greenstone Belt, Ontario.

Salisbury, M. H., Milkereit, B., and Bleeker, W., 1996. Seismic imaging of massive sulphide deposits Part 1: rock properties, Economic Geology, vol. 91. No. 57 pp. 821–828.

Sheriff, R. E., and Geldart, L. P., 1995, Explortion Seismology, Second Edition: Cambridge University Press.

Simmons, G., and Wang, H., 1971, Single crystal elastic constants and calculated aggregate properties: M. I. T. Press.

Swager C. P., Goleby, B. R., Drummond, B. J., Rattenbury, M. S., and Willias P. R., 1997.

Crustal structures of granite-greenstones terranes in the Eastern Goldfields Province, Yilgarn Block, Wash.: as revealed by seismic reflection profiling. Precambrian Research, (in press) Tegland, E. R., 1977, 3-D seismic techniques boost field development: Oil and Gas Journal, 75, no. 37, p. 79–82.

Toksoz, M. N, and Stewart, R. R., eds., Vertical seismic profiling, part B: Advanced concepts: Geophysical Press, 148–176.

Tucker, R. F, Schlegel, G. C-J., Wagener, J. H. F., and Gray, N. K., 1994, The Sun Project-II. Scientific and technological innovations in a Witwatersrand exploration venture, in Anhaeusser, C. R., ed., Proc XVth CMMI Congress: SAIMM Symposium Series S14, 3, 103–116.

Upton, P., Hobbs, B., Ord, A., Zhang, Y., Drummond, B., and Archibald, N., 1997. Thermal and deformation modeling of the Yilgarn Deep Seismic Transect. Abstract, Geodynamics and Ore Deposits Conference, Australian Geodynamics Cooperative Research Centre, Ballarat, Victoria, 22–25.

Walton, G., 1972, Three-dimensional seismic method: Geophysics, 37, 417–430.

Weatherby, B., 1940, The history and development of seismic profiling: Geophysics, 5, 215–230.

Weder, E. E. W., 1994, Structure of the area south of the Central Rand Gold Mines as derived from gravity and vibroseis surveys, in Anhaeusser, C. R, ed, Proc. XVth CMMI Congress.

SAIMM Symposium Series S14, 3, 271–281.

Widess, M., 1973, How thin is a thin bed?: Geophysics, 38, 1176–1180.

Williams, P., 1996, Using geophysics in underground hard rock mining: A question of value and vision: 66th Ann. Internat. Mtg., Soc. Expl. Geophys., Expanded Abstracts, 2046–2047.

Wyllie, M., Gregory, A, and Gardner, G., 1958, An experimental investigation of factors affecting elastic wave velocities in porous media: Geophysics, 23, 459–493.

Yeates, A., McNeill, A., Richardson, S., Barton, T. J., Drummond, B. J. Silic, J., and Richardson, R. G., 1997 High-resolution reflection seismic in the Hellyer Ore Environment.

New Developments in Research for Ore Deposit Exploration, Abs., Third National Conference, Jan. 1997, Geol. Society of Australia, p. 78.

Yilmaz, O., 1987, Seismic Data Processing: Soc. Expi Geophysicists.

What is claimed is:

1. An exploration process for evaluating a plurality of geological regions which are candidates for massive sulphide deposits, comprising the steps of:

(a) obtaining impedance characteristics for corresponding strata located in a selected one of said geological regions;

(b) analyzing the impedance characteristics for determining the presence of impedance transitions from one of the strata to another;

(c) validating the presence of a host lithology in said strata of the selected region based on said impedance transitions by determining whether said host lithology is substantially acoustically transparent, such that the host lithology is represented by a seismic profile which contains a substantial absence of impedance markers of magnitude greater than that of any survey noise present in said impedance characteristics; and (d) confirming the selected region possesses a host stratigraphy that is substantially acoustically transparent and is therefore a candidate for a subsequent seismic investigation for massive sulphide deposits.

2. A method of exploration for evaluating a plurality of geological regions for the suitability of direct detection of a massive sulphide deposit, the method comprising the steps of:

(a) obtaining impedance characteristics for corresponding strata located in a selected one of said geological regions;

(b) analyzing she impedance characteristics for determining the presence of impedance transitions from one of the strata of the selected region to another;

(c) validating the presence of a host lithology in said strata based on said impedance transitions by determining whether said host lithology is substantially acoustically transparent, such that said impedance transitions from said strata primarily contain only survey noise; and d) confirming the selected region possesses a host stratigraphy that is substantially acoustically transparent and is therefore a candidate for a subsequent seismic exploration for detection of the massive sulphide deposit.

3. The method of exploration according to claim 2, further comprising the steps of:

e) directing seismic waves at said host lithology and collecting reflected waves therefrom; and f) analyzing the reflected waves for the presence of said massive sulphide deposit.

4. The method of exploration according to claim 2, wherein the step of validating the acoustic transparency of said host lithology further includes the step of checking for the absence of a recognizable peak in said impedance characteristics that exceeds the accumulation of the survey noise.

5. The method of exploration according to claim 4, wherein said impedance characteristics are represented by a vertical seismic profile.

6. The method of exploration according to claim 4, wherein said recognizable peak represents a seismic reflection from a geological boundary contained within said strata of said host lithology.

7. The method of exploration according to claim 6, wherein said seismic reflection is from the geological boundary other than a boundary of said massive sulphide deposit.

8. The method of exploration according to claim 2, wherein said impedance characteristics are determined from velocity and density measurements of the strata in said geological region.

9. The method of exploration according to claim 2, wherein the substantially acoustically transparent host lithology is represented by a seismic profile which contains a substantial absence of impedance markers of magnitude greater than that of any said survey noise contained in said impedance characteristics.

10. The method of exploration according to claim 4, wherein the substantially acoustically transparent host lithology is represented by a seismic profile which contains a substantial absence of impedance markers of magnitude greater than that of any said survey noise contained in said impedance characteristics.

11. The method of exploration according to claim 2, wherein the step of validating further includes a verification process selected from the group comprising bore hole data, numerical modeling, and multidimensional field surveys.

12. The method of exploration according to claim 2, wherein the survey noise includes geologic noise.

13. The method of exploration according to claim 2, wherein the survey noise includes ambient environmental noise.

14. The method of exploration of claim 2, where the survey noise includes instrument noise.

15. The method of exploration according to claim 2, wherein said host lithology is located above and below said massive sulphide deposit.

16. The method of exploration according to claim 15, wherein the step of obtaining said impedance characteristics is performed within a portion of a total depth investigation range of said strata of said geological region.

17. The method of exploration according to claim 15 further comprising the step of identifying a major marker in said impedance characteristics, the major marker adjacent to said host lithology.

18. The method of exploration according to claim 17, wherein the major marker represents a recognizable peak in said impedance characteristics while facilitating the determination of the acoustic transparency of the adjacent host lithology.

19. The method of exploration according to claim 17 further comprising the step of using the major marker to focus the search for said massive sulphide deposit.

20. The method of exploration according to claim 3, wherein the step of analyzing the reflected waves provides a seismic amplitude anomaly at least twice that of a contact within said host lithology, the seismic anomaly resulting from said massive sulphide deposit.

* * * * *